May 28, 1946. E. D. GREEN 2,401,068
WALKING IRON
Filed Dec. 11, 1943
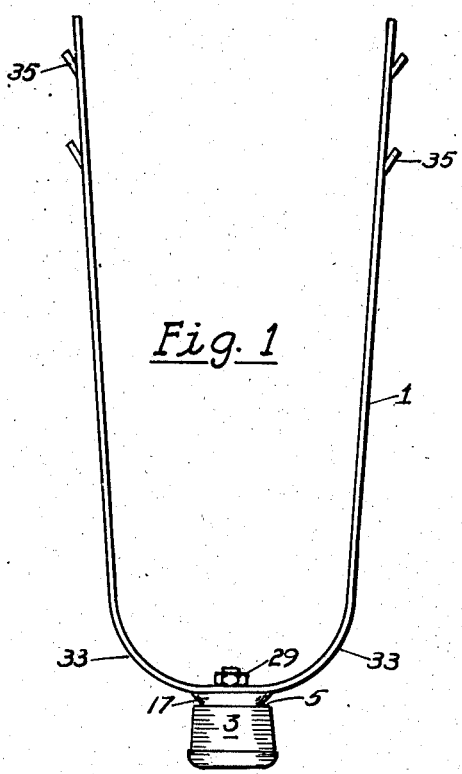
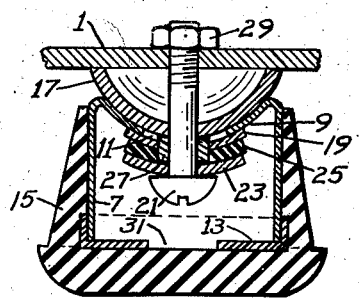
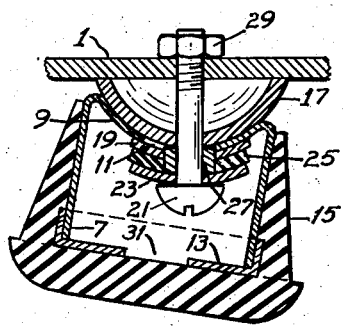
Inventor
ELIOT D. GREEN
By Lippincott + Metcalf
Attorney Patented May 28, 1946

2,401,068

UNITED STATES PATENT OFFICE 2,401,068

WALKING IRON

Eliot D. Green, San Francisco, Calif.

Application December 11, 1943, Serial No. 513,968

5 Claims. (Cl. 128—87)

My invention relates to walking irons, a device applied to a cast on a fractured leg to permit substantial use of the leg during healing of the fracture.

Among the objects of my invention are:

1. To provide a novel and improved walking iron permitting a close approach to normal walking freedom.

2. To provide a novel and improved walking iron designed to minimize the development of torsional stresses and strain in a fractured limb during walking.

3. To provide a novel and improved walking iron permitting virtually normal heel to toe walking.

4. To provide a novel and improved walking iron capable of being molded or shaped to conform to the cast to which it is applied.

5. To provide a novel and improved walking iron permitting limited universal movement on a shock absorbing cushion.

6. To provide a novel and improved walking iron of simple design and so constructed as to provide positive and firm interlocking with the material of a cast to which it is anchored.

Additional objects of my invention will be brought out in the following description of a preferred embodiment of the same, taken in conjunction with the accompanying drawing wherein—

Figure 1 is a vertical elevational view of my novel and improved walking iron;

Figure 2 is a view in section through the ground-engaging portion and joint assembly when in symmetrical position with respect to the cast anchoring portion;

Figure 3 is a similar view illustrating the limited universal motion permitted by such joint assembly.

In its preferred embodiment, my improved walking iron comprises a cast anchoring portion 1 of U-shape and a ground engaging portion or assembly 3 attached at the lower end of the U-shaped element by a rattle-free joint 5 of novel construction permitting limited universal movement.

The ground engaging assembly 3 comprises an inverted cup-shaped element 7 having a depressed bottom 9 of substantially hemispherical contour and provided with a central opening 11. The lower or open end of this inverted cup-shaped element is spanned by a cap or closure 13 preferably press-fitted thereon. A rubber boot 15 is adapted to be slipped over the cap 13 and engage the side walls of the inverted cup-shaped element 7, in which position, the edges of the cap will serve to act as a lock to prevent the boot 15 from slipping off in use.

The ground-engaging assembly is assembled to the cast anchoring U-shaped element 1 by frictionally clamping the depressed bottom 9 between a substantially hemispherical element 17, having its base contacting the U-shaped element, and a cupped washer 19, by a machine screw or bolt 21 passing through this washer and hemispherical element and engaging a threaded opening in the bottom end of the U-shaped element.

The cupped washer 19 comprises one of an assembly of washers which includes a second cupped washer 23 adjacent and in contact with the head of the screw 21 and spaced from the first washer 19 by an intermediate washer 25 of resilient material such as rubber. This washer assembly performs a very important function, in that the intermediate resilient washer 25 provides for a sufficient amount of give to permit universal movement of the ground-engaging assembly upon the hemispherical element as a bearing surface in response to the shifting of weight of a patient during walking while at the same time, compensating for wear in the joint, to preclude the development of looseness and accompanying rattling of parts after a period of use.

Too high a degree of compression of the washer assembly, however, would serve to lessen the ability of such assembly to perform its proper function in the operation of the device during use, so in order to preclude such high degree of compression of the washer assembly as to destroy its efficiency, I provide a collar 27 around the shank of the bolt between the hemispherical element 17 and the cupped washer 23 adjacent the head of the screw. The length of this collar is just sufficient to permit the required amount of compression of the washer assembly before the compression effect of the screw is taken up by the collar.

This collar 27 performs an additional function of importance in my device, in that it cooperates with the edge of the opening 11 in determining the limit of universal movement of the ground-engaging assembly. This function of the collar is clearly illustrated in Figure 3 of the drawing.

A nut 29 applied to the end of the machine screw serves as a locking nut rather than a tightening nut, in view of the fact that the screw 21 is threaded through the U-shaped element. Thus the likelihood of the screw coming loose is thereby minimized.

In assembling the ground-engaging portion 3 to the U-shaped element 1, the inverted cup-shaped element 7 is clamped into position prior to applying the cap 13 and the boot 15 thereto. The cap 13 is provided with a central aperture 31 to enable access to the screw with a screwdriver at any time that it becomes necessary to make adjustments or repairs.

The U-shaped element 1 is formed with corners 33 of substantial radius of curvature as distinguished from sharp bends, while anchoring tabs 35 are punched out from the side members of the U-shaped element.

The walking iron is applied to a patient by straddling the foot end of the cast and then anchoring the side members to the cast by bandages and cast material such as plaster of Paris. In this connection, the rounded corners of the U-shaped element afford a decided advantage over the conventional square ends of prior art walking irons, in that they enable the U-shaped element to be molded to conform to the end of the cast to which it is applied.

The anchoring tabs provided in the side members of the U-shaped element being integral with the U-shaped element 1 not only provide very substantial weight-carrying means, but, by reason of their shape, they facilitate the application of the bandages and cast material, at the same time simplifying the procedure of removing the cast from a person's limb.

From the above description of my invention, it will be apparent that the same fulfills all the objects recited therefor, and while I have limited my description to a specific embodiment of my invention, it is apparent that the same is subject to alteration and modification, without departing from the broad features incorporated therein, and, therefore, I do not desire to be limited in my protection to such details as I have disclosed and described, except as may be necessitated by the appended claims.

I claim:

1. A walking iron comprising a U-shaped element; a ground engaging portion; and means affixing said ground engaging portion to said U-shaped element, said means including a joint having limited universal movement.

2. A walking iron comprising a one-piece U-shaped element having corners of substantial radius of curvature and integral anchoring tabs directed away from and at an angle to the side members of said U-shaped element, a ground engaging assembly, and means affixing said ground engaging assembly to said U-shaped element intermediate said corners and permitting limited universal movement thereof.

3. A walking iron comprising a U-shaped element; a ground engaging assembly including an inverted cup-shaped element having a depressed bottom centrally apertured, and a boot of resilient material fitting over said cup-shaped element; and means affixing said ground engaging assembly to said U-shaped element including an element providing a bearing surface for sliding contact by the depressed bottom of said inverted cup-shaped element, a washer within said inverted cup-shaped element said washer being cupped to conform to the general curvature of said depressed bottom, a clamping screw passing upwardly through said washer and said aforementioned element into engagement with said U-shaped element and clamping said depressed bottom between said element and said washer.

4. A walking iron comprising a U-shaped element having corners of substantial radius of curvature; a ground engaging assembly including an inverted cup-shaped element having a depressed bottom centrally apertured, and a boot of resilient material fitting over said cup-shaped element; and means affixing said ground engaging assembly to said U-shaped element including a substantially hemispherical element having its base contacting the U-shaped element to expose a bearing surface for sliding contact by the depressed bottom of said inverted cup-shaped element, a compressible washer assembly within said inverted cup-shaped element said washer assembly being cupped to conform to the general curvature of said depressed bottom, and a machine screw passing upwardly through said washer assembly and hemispherical element into screw threaded engagement with said U-shaped element and clamping said depressed bottom between said hemispherical element and said washer assembly.

5. A walking iron comprising a U-shaped element having corners of substantial radius of curvature and integral anchoring tabs on the side members of said U-shaped element; a ground engaging assembly including an inverted cup-shaped element having a depressed bottom centrally apertured, a centrally apertured cap spanning said cup-shaped element, and a boot of resilient material fitting over said cap and cup-shaped element; and means affixing said ground engaging assembly to said U-shaped element including a substantially hemispherical element having its base contacting the U-shaped element to expose a bearing surface for sliding contact by the depressed bottom of said inverted cup-shaped element, a compressible washer assembly within said inverted cup-shaped element, said washer assembly being cupped to conform to the general curvature of said depressed bottom, a machine screw passing upwardly through said washer assembly and hemispherical element into screw threaded engagement with said U-shaped element and clamping said depressed bottom between said hemispherical element and said washer assembly, and a collar on said machine screw limiting both the compressibility of said washer assembly and the extent of permissible movement of said cup-shaped element on said hemispherical element.

ELIOT D. GREEN.